(12) United States Patent
Malek et al.

(10) Patent No.: US 8,474,902 B2
(45) Date of Patent: Jul. 2, 2013

(54) TRANSVERSE-MEMBER MODULE FOR A MOTOR-VEHICLE

(75) Inventors: Thomas Malek, Pulheim (DE); Boris Koch, Wermelskirchen (DE); Ulrich Dajek, Leverkusen (DE)

(73) Assignee: LANXESS Deutschland GmbH, Leverkusen (DE)

( * ) Notice: Subject to any disclaimer, the term of this patent is extended or adjusted under 35 U.S.C. 154(b) by 0 days.

(21) Appl. No.: 13/085,983

(22) Filed: Apr. 13, 2011

(65) Prior Publication Data

US 2011/0285174 A1 Nov. 24, 2011

(30) Foreign Application Priority Data

Apr. 15, 2010 (EP) .................................... 10160060

(51) Int. Cl.
*B62D 25/14* (2006.01)
*B60K 37/00* (2006.01)

(52) U.S. Cl.
USPC ...................................... 296/193.02; 296/72

(58) Field of Classification Search
USPC ............. 296/193.02, 193.03, 193.04, 193.09, 296/203.02, 203.04, 70, 72; 180/90
See application file for complete search history.

(56) References Cited

U.S. PATENT DOCUMENTS

| | | | |
|---|---|---|---|
| 4,584,360 A | 4/1986 | Paul et al. | |
| 5,521,258 A | 5/1996 | Cooper et al. | |
| 6,174,958 B1 * | 1/2001 | Guntherberg et al. | 525/67 |
| 6,273,495 B1 * | 8/2001 | Haba et al. | 296/193.02 |
| 6,523,878 B2 * | 2/2003 | Scheidel | 296/70 |
| 6,541,571 B1 | 4/2003 | Haldankar | |
| 6,780,365 B2 | 8/2004 | Goldbach | |
| 6,796,604 B2 | 9/2004 | Igura et al. | |
| 6,851,742 B1 * | 2/2005 | Kubiak | 296/193.02 |
| 7,291,785 B2 | 11/2007 | Riester et al. | |

(Continued)

FOREIGN PATENT DOCUMENTS

| | | |
|---|---|---|
| DE | 3334782 A1 | 10/1984 |
| DE | 4206191 A1 | 9/1993 |

(Continued)

OTHER PUBLICATIONS

European Search Report dated Jun. 17, 2010.

(Continued)

*Primary Examiner* — Glenn Dayoan
*Assistant Examiner* — Sunsurraye Westbrook
(74) *Attorney, Agent, or Firm* — Norris McLaughlin & Marcus, P.A.

(57) ABSTRACT

The present invention relates to a transverse-member motor-vehicle module for receiving the instrument panel and reinforcing the bodywork for the direct connection of the two A-pillars of a motor vehicle, composed of a transverse member with a steering-column retainer, where the transverse-member module, i.e. not only the transverse member but also the steering-column retainer, are manufactured using a metal-plastic-composite design (hybrid technology), and these are composed of at least one main body and of at least one first thermoplastic part and one second thermoplastic part, where these have been securely bonded via injection molding firstly to the main body and simultaneously the various plastics parts have been bonded to one another, where the two plastics parts are composed of different plastics materials and these are injected in the bi-injection molding process, where they fuse with one another when they encounter one another.

12 Claims, 5 Drawing Sheets

U.S. PATENT DOCUMENTS

| | | | |
|---|---|---|---|
| 8,100,463 B2 * | 1/2012 | Penner et al. | 296/193.02 |
| 2003/0152745 A1 | 8/2003 | Wagenblast | |
| 2006/0147672 A1 | 7/2006 | Ruiz | |
| 2007/0228595 A1 * | 10/2007 | Lange et al. | 264/46.8 |
| 2008/0268259 A1 * | 10/2008 | Schmatloch et al. | 428/423.1 |
| 2008/0269452 A1 * | 10/2008 | Schwoeppe et al. | 528/28 |
| 2009/0068477 A1 * | 3/2009 | Buck | 428/448 |

FOREIGN PATENT DOCUMENTS

| | | |
|---|---|---|
| DE | 200808201 U1 | 7/2000 |
| DE | 10022360 A1 | 11/2001 |
| DE | 10064522 A1 | 3/2002 |
| DE | 10240395 A1 | 3/2004 |
| DE | 10360045 A1 | 7/2005 |
| DE | 102004032951 A1 | 1/2006 |
| DE | 102004060009 A1 | 7/2006 |
| DE | 102005004605 A1 | 8/2006 |
| DE | 202006019341 A1 | 3/2007 |
| DE | 102006013685 A1 | 9/2007 |
| DE | 102006025745 A1 | 12/2007 |
| DE | 102008012066 U1 | 9/2009 |
| DE | 202008012066 U1 | 1/2010 |
| EP | 0365916 | 5/1990 |
| EP | 0711810 A | 5/1996 |
| EP | 1380493 A2 | 1/2004 |
| WO | 02064343 A1 | 8/2002 |
| WO | 2004071741 A1 | 8/2004 |

OTHER PUBLICATIONS

International Search Report dated Jun. 17, 2010.

* cited by examiner

_US 8,474,902 B2_

TRANSVERSE-MEMBER MODULE FOR A MOTOR-VEHICLE

BACKGROUND OF THE INVENTION (1) Field of the Invention

The present invention relates to a transverse-member motor-vehicle module for receiving the instrument panel and reinforcing the bodywork for the direct connection of the two A-pillars of a motor vehicle, composed of a transverse member with a steering-column retainer, where the transverse-member module, i.e. not only the transverse member but also the steering-column retainer, are manufactured using a metal-plastic-composite design (hybrid technology), and these are composed of at least one main body and of at least one thermoplastic part and one second thermoplastic part, where these have been securely bonded via injection moulding firstly to the main body and simultaneously the various plastics parts have been bonded to one another, where the two plastics parts are composed of different plastics materials and these are injected in the bi-injection moulding process, where they fuse with one another when they encounter one another and enter into a secure bond with the metal.

(2) Description of Related Art

Known steering-column retainers, also termed steering consoles, are composed of a plurality of welded sheet-metal profiles in steel or diecast components (e.g. composed of aluminium or magnesium), welded to the load-bearing structure of the instrument-panel transverse member to give transverse-member modules, or securely connected so as to form a single piece or, respectively, in the form of combined profiles, composed of aluminium, of steel, of magnesium, or of plastics-metal-hybrid design.

DE 10 2005 004 605 A1 discloses a transverse-member module for a motor vehicle comprising an at least partially plastics-surrounded metal tube, with, moulded on so as to form a single piece, a plastics duct through which a conductor set can be passed, with a moulded-on link composed of plastic, for fixing to the front wall of the motor vehicle by screw-thread methods.

DE 102 40 395 A1 discloses a transverse member which is intended for a motor vehicle and which, in the region of the curved portion of the tube, has a welded-on metal steering-column link, onto which the screw-on plate of the steering column is mounted. The manufacture of the curved section of the said transverse member uses a metal-plastics-hybrid design.

DE 200 08 201U1 discloses an instrument-panel support in hybrid-type configuration for installation between the A-pillars of a motor vehicle and having an elongate, shell-like main body, and also stabilizing insert parts composed of metallic materials, which have been joined via moulded-on interior plastics ribbing to give a metal/plastics-composite part, and through which at least one air duct passes at least to some extent, where, simultaneously with the plastics ribbing, retainers, consoles and link points composed of plastic and projecting outwards from the main body have been moulded on so as to give a single piece.

DE 100 64 522 A1 describes a component for a motor vehicle, in particular transverse member for arrangement between the A-pillars of a motor vehicle, with an essentially tube-like main body, within which there is at least one duct provided. In order to provide an improved lightweight component which can be produced more easily, with fewer operations, and therefore at lower cost, and into which a duct can be integrated in advantageous manner, DE 100 64 522 A1 proposes that the main body have an internal lining of plastic to form duct walls composed of plastic. The said component can be used as instrument-panel support in a motor vehicle. Holders, such as a steering-column holder, are attached to the main body, and these holders are likewise preferably composed of metal. According to DE 100 64 522 A1, the holders can be surrounded by plastic, thus increasing their stiffness, eliminating rattle, and providing edge protection.

DE 100 22 360 A1 describes a composite component composed of two or more profiles and describes a process for production of this component, where a free end of at least one profile is adjacent to the second profile or protrudes into the second profile, characterized in that reinforcement elements have been attached in the region of the junction site of the profiles and form an interlock bond with the profiles, and that the profiles have been bonded to one another via thermoplastic that has been applied by a moulding or shrinkage process in the region of the junction site.

DE 103 60 045 A1 describes a hybrid transverse member for a vehicle with a metallic cross strut with a section which runs in the form of an open channel in the main direction of the hybrid transverse member, and the longitudinal edges of which have been bonded, in one section, to a structural element composed of plastic, preferably via an adhesive joint.

There is also a hybrid transverse member proposed for a vehicle and having a metallic transverse strut which comprises a section running in the main direction of the hybrid transverse member in the form of an open channel, and with a steering-column link attached centrally externally thereto, and also with an auxiliary strut arranged within the profile of the metallic transverse strut in the region of the steering-column link.

DE 10 2004 032 951A1 relates to a component, in particular a transverse member for arrangement between A-columns of a motor vehicle, with a main body which is designed in essence as hollow profile and which internally has a guide duct, and which has at least one link with which it is possible to integrate an add-on part subsequently in a processing step.

DE 10 2008 012 066 U1 reveals a transverse-member module which is intended to receive the instrument panel of a motor vehicle, comprising an at least partially plastics-surrounded metal tube, and a simply moulded sheet-metal profile functioning as steering-column retainer and designed and placed in such a way that, in the composite with moulded-on plastic, it firstly gives a stiff connection between steering column and front wall and secondly has firm connection to the metal tube by way of a structure consisting entirely of plastic.

A feature common to all of the solutions described in the prior art for the connection of steering-column retainer and transverse member is that they either comprise only holders composed of metal or composed of plastic which do not receive a steering console until an additional operation is carried out, or, to the extent that the moulding-on of the steering console is simultaneous with that of the plastic for the ribbing, this is composed solely of plastic, as is the case in DE 200 08 201U1.

The consequence of the two-part design is increased operating cost, and the consequence of the solution entirely composed of plastics according to DE 200 08 201U1 is lack of stability. The solutions described in the prior art moreover exhibit disadvantageous vibration behaviour, perceptibly extending as far as the steering wheel. Although DE 10 2005 004 605 A1 indicates that the proposed hybrid design of the transverse-member module reduces oscillating mass, but provides a transverse member with relatively high intrinsic frequency, giving a transverse-member module with a high level of vibration comfort, it has been found that in modified vehicle configurations this mitigation of vibration behaviour solely of the transverse member is insufficient, and in fact that unpleasant vibration behaviour extends as far as the steering wheel.

Another disadvantage of the transverse-member motor-vehicle modules described in the prior art is the fact that when there is a need to perform various functions, functional elements using exactly the same type of plastic are moulded on to the transverse-member module. By way of example, in DE 100 64 522 A1 exactly the same plastic serves for moulding air-outflow connections, retainers and link elements, or a plastics shell, and also to ensure link thereof to the tubular transverse member. Here, exactly the same plastic is assuming not only functions subject to load but also functions which have no or only slight exposure to load during the operation of a motor vehicle.

One way of taking account of this situation is to use multicomponent technology. The various types of multicomponent technology are
   Bi-injection moulding, i.e. simultaneous injection of two or more components into the same cavity.
   Core-back processes, i.e. the injection of two or more components in sequence, where the cavity for the 2nd component is made available by withdrawing a sliding barrier.
   Transfer processes, i.e. using a preform which is transferred to a 2nd cavity or 2nd machine before the 2nd component is injected.
   Sandwich processes, i.e. construction of layers using outer skin/core, where the layers are injected in succession.

BRIEF SUMMARY OF THE INVENTION

The object of the present invention therefore consisted firstly in improving the intrinsic vibration behaviour of the entire instrument-panel support together with the steering console and the steering column to be secured thereto (also termed steering-column tube) with the aim that firstly the first-mode natural frequency measured at the steering wheel is >36 Hz, and, in comparison with the prior art cited above, additional results are a further weight reduction, cost reduction, and also simplified production processes.

The difficulty consists specifically in the fact that the steering-column retainer has the task of receiving the steering column and serving as important connection element between the bulkhead (constituent of load-bearing bodywork) and the instrument-panel transverse member. The steering-column retainer here must produce a connection of maximum stiffness which has a decisive effect on the intrinsic vibration behaviour of the instrument-panel transverse member. The undesirable intrinsic vibrations are caused by, for example, excitation derived from the engine, from the power train and from the chassis. These vibrations propagate by way of the bodywork into the steering rod and into the steering wheel, and also into the entire dashboard, causing vibrations at the steering wheel and noise in the interior of the vehicle. The result is unacceptable reductions in comfort.

The object is achieved by, and the present invention therefore provides, a transverse-member motor-vehicle module for receiving the instrument panel of a motor vehicle using a plastics-metal-hybrid design comprising at least one partially plastics-surrounded main body composed of metal or of a high-strength plastics material, preferably in tubular form, and a simply moulded sheet-metal profile functioning as steering-column retainer and designed and placed in such a way that it, in the composite with at least one plastic to be moulded on, firstly gives a stiff connection between steering column and front wall and secondly has firm connection to the main body or, respectively, to the main body by way of a structure consisting entirely of plastic, characterized in that by way of the use of at least two different plastics moreover link elements for functional elements are simultaneously moulded on, and the various plastics materials permit secure bonding of the various plastics parts to one another, in that the melt fronts of the various plastics materials fuse with one another when they encounter one another in the bi-injection moulding process.

Surprisingly, the secure connection of transverse-member module and a steering-column retainer likewise manufactured using hybrid design firstly gives, in the installed condition, optimized intrinsic vibration behaviour, i.e. a first-mode natural frequency >36 Hz at the steering wheel, and also a reduction in the cost and the weight of the entire vehicle in that components manufactured hitherto from metal can be replaced by plastic, with resultant contribution to a further reduction in the weight of motor vehicles. Finally, the inventive combination of transverse-member module and steering-column retainer, and also functional elements for installing functional components, can be produced in simplified manner in a single operation, by overmoulding and connecting at least two main bodies, for example a metal tube and the moulded metal sheet, and also the link elements for functional elements, together in the same mould in a single operation by the bi-injection moulding process, where the various plastics or melt fronts fuse with one another within the same cavities where they encounter one another.

According to the invention, bi-injection merely means the simultaneous injection of at least two plastic components. An unambiguous feature here is that both, or all of, the melt fronts of the plastics to be injection-moulded have not solidified when they encounter one another, and that their spread is not restricted by any technical features of the moulding process, for example slides or mould cores.

Surprisingly, the transverse-member modules produced according to the invention, produced via simultaneous injection of the plastics components by the bi-injection-moulding process, exhibit strength of the confluence zone of both, or of all, the plastics which is at least as high as the flow line strength of a conventional component composed of a single plastic, and the transverse-member module itself here has lower weight.

The bond strengths are markedly greater than would be expected on the basis of the prior art and moreover the structure of the mould is simpler because there is no need for any mould cores or slides which require separate activation. Instead of this, a "contact zone" of the plastics components is obtained, and is not subject to any precise restriction by technical factors of the moulding process, but instead is determined by way of the relative positioning of the gating for the various components, and by the process parameters. The two injection assemblies can by way of example inject at different rates or else with a time shift, in order to inject more of one of the components or more of the other component, with resultant controlled displacement of the "contact zone". When the melt fronts encounter one another here they are in molten condition.

The present invention also provides a process for influencing the intrinsic vibration behaviour of the instrument-panel support of motor vehicles in the installed condition to give a first-mode natural frequency >36 Hz, characterized in that a transverse-member module is attached under the instrument panel of a motor vehicle, composed of at least one partially plastics-surrounded main body composed of metal or of a high-strength plastics material, preferably in tubular form, and a simply moulded sheet-metal profile functioning as steering-column retainer and designed and placed in such a way that, in the composite with at least one plastic to be moulded on, firstly a very stiff connection results between steering column and front wall and secondly firm connection to the main body or, respectively, to the main body by way of a structure consisting entirely of plastic is achieved, where, by way of the use of at least two different plastics moreover link elements for functional elements are moulded on, and, the various plastics materials permit secure bonding of the various plastics parts to one another, in that the various plastics materials fuse with one another when they encounter one another in the bi-injection moulding process.

The present invention also provides the use of a transverse-member module for attachment under the instrument panel of a motor-vehicle, comprising an at least partially plastics-surrounded main body, preferably a tubular main body, composed of metal or of a high-strength plastics material, preferably composed of metal, and a simply moulded sheet-metal profile functioning as steering-column retainer and designed and placed in such a way that it, in the composite with moulded-on plastic, firstly gives a stiff connection between steering column and front wall and secondly has firm connection to the main body by way of a structure consisting entirely of plastic, where, by way of the use of at least two different plastics moreover link elements for functional elements are moulded on, and the various plastics materials permit secure bonding of the various plastics parts to one another, in that the various plastics materials fuse with one another when they encounter one another in the bi-injection moulding process, for influencing the intrinsic vibration behaviour of the instrument-panel support in the installed condition to give a first-mode natural frequency >36 Hz. In one preferred embodiment, the first-mode natural frequency is from 36.1 to 50 Hz, particularly preferably from 37.1 to 39 Hz. It is preferable that the transverse-member module of the invention is used in motor vehicles, and it is particularly preferably used in passenger vehicles or heavy goods vehicles.

In one preferred embodiment, the plastics structure produced in the injection-moulding procedure for the transverse-member module includes reinforcing ribs composed of one of the at least two different plastics to be used which not only stiffen the connection to the instrument-panel transverse member but also assume the function of bracing and supporting the overmoulded sheet-metal profile, and bring about transmission of force into the front wall over a large area. The reinforcing ribs in turn have preferably been securely connected to the sheet-metal profile at discrete connection sites by way of perforations in the sheet-metal profile, where the plastic extends through the perforations and extends over the surfaces of the perforations.

In one preferred embodiment of the present invention, the metal main body, preferably a metal tube, and/or the sheet-metal profile used for the steering-column retainer has a coating of adhesion promoter or adhesive. DE 10 2006 025 745 A1 discloses adhesion promoters to be used according to the invention, and its entire content relating to this matter is incorporated by way of reference into the present application. The adhesion promoter or adhesive is preferably a two-stage adhesion promoter which crosslinks completely in two sequential steps, preferably via thermal activation. The adhesion promoter or adhesive can be applied to the sheet-metal profile or metal material prior to stamping and/or shaping, etc. This type of application preferably takes place onto the sheet-metal profile by the "coil-coating" process, prior to operations thereon. This process is particularly cost-efficient. However, the adhesion promoter or adhesive can also be applied by spray, dip-coat, or powder-spray methods, etc.

After application to the sheet-metal profile and/or metal tube, it is partially crosslinked in a first step, thus forming a surface which is "dry to the touch", with adequate resistance to damage from handling. During or after the moulding-on of the plastic, the adhesion promoter or adhesive is crosslinked completely, so that it obtains its final properties. In order to achieve the activation energy necessary for the second phase of crosslinking of the adhesion promoter, it can be advantageous to heat the plastics mould and/or to heat the sheet-metal insert profile or the metal main body, preferably the metal tube, and/or to ensure that the temperature of injection of the plastics material into the injection mould is sufficiently high to bring about crosslinking. As an alternative, it is possible to achieve complete crosslinking by annealing after the moulding-on process.

The adhesion promoter or adhesive which provides the coherent link between plastic and sheet-metal profile and/or metal tube is preferably a polyurethane system or an epoxy system, particularly preferably an epoxy resin based on bisphenol A and/or on bisphenol B and/or on bisphenol C and/or on bisphenol F.

Preferred adhesion-promoter systems or adhesives for the plastics materials to be used according to the invention are based on elastomer-modified epoxy adhesives, particularly with covalent linking via copolymerization of 1,3-butadienes and/or with physical binding via addition of rubber.

In an alternative, preferred embodiment, in a separate process step; only after the overmoulding process, the sheet-metal profile is connected to the plastics structure of the metal tube via hot-riveting or other types of riveting, clinching, adhesive bonding, or screw-thread methods and this connection is additional to the bond which always results from the injection-moulding procedure.

In one preferred embodiment of the invention, the main body, preferably the metal tube, used in the transverse-member module is a pipe pinched at both ends, with holes located in both pinched ends. The holes provided at the pinched ends serve as screw-on lugs for the A-pillars during the assembly of the transverse-member module within the vehicle bodywork. The advantage of this design is that there is no need for welding-on of additional angle brackets, such as those otherwise conventional for linking A-pillars in the prior art. The additional manufacturing step for welding-on of an A-pillar link can therefore be omitted, and problems of distortion at these sites are therefore also eliminated.

It is moreover preferable that the transverse-member module has, in addition to the steering-column retainer, a moulded-on plastics lug at each pinched end of the main body, preferably of the metal tube, and that there is a through-bore located in each moulded-on plastics lug. This further through-bore serves for further linking of the transverse-member module to the A-pillar, and particularly for excluding any rotation of the transverse-member module about the longitudinal axis of the metal tube.

The material of the main body can generally be selected with a view to the mechanical properties demanded. As a function of vehicle type, moreover, relatively high importance has to be allocated either to installation-space optimization or to weight optimization, and this likewise influences the selection of a suitable material for the main body. Finally, because there is direct contact between the main body, preferably a metal tube and the A-pillar in the motor vehicle, the selection of material also takes into account corrosion requirements relevant to this pairing of materials. The main body is preferably seamless, but can also be a metal tube with a longitudinal weld seam or else an extruded metal tube. The exterior dimensions of the main body, preferably of the metal tube, preferably have narrow tolerances, in order that the injection mould forms a tight seal with the main body and high manufacturing quality can be achieved during the partial overmoulding of the main body and of the steering-column retainer with plastic. In one preferred embodiment, the main body, preferably the metal tube, is of straight design, i.e. it has no curved portions where curvature deformation could occur if pressure forces were introduced into the main body by way of the pinched ends (in the event of a side impact).

The transverse-member module of the invention has at least one moulded-on receiving means or a link element for functional elements. Functional elements of the invention are a passenger airbag and/or knee protectors and/or receiving means for a radio unit and/or navigation unit, to name just a few examples. Further link elements are listed in the legend to the figures and likewise form part of the present disclosure. All of the receiving means and link elements mentioned, which can have been moulded on as alternatives or in any desired combination with one another, as a single piece on the transverse-member module, facilitate the assembly of various cockpit components. A further receiving means moulded on as alternative or in combination serves for linking of the cardan tunnel. An advantage of cardan tunnel linking is that the transverse-member module has, between the securing points to the respective A-pillars, an additional securing point to the vehicle bodywork, thus firstly increasing the strength and stiffness of the entire composite and secondly also advantageously influencing the vibration behaviour of the transverse-member module.

According to one preferred embodiment of the invention, the transverse-member module also comprises, on the main body, preferably the metal tube, regions not surrounded by the plastic, these serving for the attachment of connection elements, by way of which it is possible to secure a screw-on plate of the steering column. Connection elements can be used to integrate the steering-column link. Preferred connection elements are pipe clamps. This method also eliminates any welded connection, with its attendant problems of distortion, in the region of the steering-column link. To permit secure attachment, this method is preferably used directly at the main body, preferably at the metal tube, i.e. at a site not surrounded by plastic.

According to one preferred embodiment of the invention, the transverse-member module also comprises a plastics duct, preferably to receive electrical cables. In a particularly preferred embodiment, the transverse-member module comprises a plastics duct with additional foam elements which surround the conductor set passed through the plastics duct. These foam elements can be inserted into the plastics duct optionally provided on the main body, and are of dimensions such that they expand elastically in the plastics duct and become fixed against its inner wall. The foam elements are preferably composed of PE foam, foam rubber or similar materials. PE foam is very inexpensive, whereas foam rubber is advantageous in relation to elasticity and the coefficient of friction important for fixing within the plastics duct (PE=polyethylene). The advantage of the foam elements is that various thicknesses of conductor sets can be accepted by virtue of the elasticity of the foam elements. Conductor sets of differing thickness occur particularly with the use of customer-specific cable harnesses. The compressibility of the foam elements and their recovery properties can be used to fix the conductor set within the optionally present plastics cable duct. It is moreover possible to eliminate the complicated use of adhesive tape for winding around the entire bundle of individual conductors, because the foam elements eliminate rattle of the individual conductors in the optionally present plastics duct.

In the plastics duct there are moreover preferably moulded-on guide grooves arranged parallel to one another, between each of which a foam element can be inserted. This method can not only facilitate precise positioning during insertion of the foam elements but can also ensure exact positioning of the individual foam elements within the plastics duct.

According to one preferred embodiment, the conductor set passed through the optionally present plastics duct comprises individual conductors held together in essence only by binders. Binders are used in order to define the position of branching conductors. In other words, winding around the entire bundle of individual conductors can be eliminated, and the only remaining requirement is for binders at those sites where there is defined branching of individual conductors or of strands thereof.

The dimensioning of the plastics duct is preferably such that it can receive a conductor set for the entire on-board network. The conductor set here also comprises an engine-compartment conductor set, preferably surrounded by a plate or bushing, the dimensions of which have been matched to the size of an aperture in the front wall of the vehicle. It is therefore possible, with the assembly process for the transverse-member module, to assemble, within the plastics duct, a conductor set which by this stage comprises the engine-compartment conductor set, and which is passed into the engine compartment through an appropriate aperture in the front wall. To permit leakproof reclosure of the appropriate aperture in the front wall, the appropriate plate or bushing has been provided by this stage, for this purpose.

The materials used for the sheet-metal profile of the steering-column retainer, or those used for the main body, preferably a metal tube, are particularly preferably steel, aluminium, aluminium alloys, steel alloys, magnesium, titanium, or glass- or carbon-fibre-reinforced plastics. In an alternative embodiment of the present invention, the sheet-metal profiles composed of various materials from the above-mentioned series can be combined with one another. It is particularly preferable that any metal tube to be used uses steel. In an alternative embodiment, the main body can, however, also be composed of a high-strength plastics material, in particular of organic sheet. The use of organic sheet in structural components is disclosed, for example, in DE 20 2006 019 341A1. Its production is described for example in DE 10 2006 013 685 A1 or in DE 10 2004 060 009 A1.

In order to obtain the rib structure of the material surrounding the tube, and to obtain the connection of transverse-member module and steering-column retainer and in order to obtain link elements, thermoplastic polymers are preferably used in the form of polymer moulding compositions.

According to the invention, at least two different plastics are simultaneously securely bonded via injection moulding both to the main body and also to one another, by the bi-injection moulding process. The bi-injection moulding process is known to the person skilled in the art. Reference may be made to WO 02/064343 A1 by way of example for the use of the bi-injection moulding process in automobile construction.

In the further embodiments, for the sake of clarity, there are assumed to be two thermoplastics, but this does not exclude the possibility of combining a much larger number of plastics in the present invention.

The present invention preferably provides a transverse-member motor-vehicle module in which the fusion of the two plastics takes place during the bi-injection moulding process within the same cavity where they encounter one another.

Plastics preferably selected to be injection-moulded are thermoplastic polymers, particular preference being given to thermoplastic polymers from the group of polyamide, polyester, polypropylene or any possible mixture of the polymers mentioned.

For the purposes of the present invention, the expression a larger number of plastics, or various plastics, means at least two different plastics, and the expression different plastics here means polymers from the abovementioned group but also plastics based on the same polymer but with different content of filler and/or of reinforcing material.

Processes for the production of the thermoplastics to be used according to the invention are known per se to the person skilled in the art. The effects to be achieved are likewise apparent in all of the variations disclosed in the prior art cited above of the use of hybrid technology, irrespective of whether the plastics part encapsulates the metal part completely or, as in the case of EP 1 380 493 A2, merely forms a web around it, and irrespective of whether the plastics part is subsequently incorporated by adhesion or connected by way of example by a laser to the metal part, or whether, as in WO 2004/071741A1, the plastics part and the metal part obtain the secure interlock bond in an additional operation.

In one embodiment variant, the present invention therefore also provides transverse-member motor-vehicle modules of the type described above, where the plastics material of the first plastics part differs from the plastic of the second plastics part via the content of fillers and/or of reinforcing materials. However, it is possible according to the invention that any of the abovementioned polymers is provided with fillers and/or with reinforcing materials.

In every case, the amount of filler differs when the same polymer is used in the plastics to be used. However, when different polymers are used in the two plastics, the amount of filler present can certainly be identical.

If the same thermoplastic is used in the two plastics, the difference in filler content of the two thermoplastics is from 0:70 to 70:0 parts by weight, preferably from 30:65 to 65:30 parts by weight, particularly preferably from 15:60 to 60:15 parts by weight.

Polyamides to be used with preference according to the invention are semicrystalline polyamides (PA), which can be prepared starting from diamines and dicarboxylic acids and/or from lactams having at least 5 ring members, or from corresponding amino acids. Starting materials that can be used for this purpose are aliphatic and/or aromatic dicarboxylic acids, such as adipic acid, 2,2,4- and 2,4,4-trimethyladipic acid, azelaic acid, sebacic acid, isophthalic acid, terephthalic acid, and aliphatic and/or aromatic diamines, e.g. tetramethylenediamine, hexamethylenediamine, 1,9-nonanediamine, 2,2,4- and 2,4,4-trimethylhexamethylenediamine, the isomeric diamino-dicyclohexylmethanes, diaminodicyclohexylpropanes, bisaminomethylcyclohexane, phenylenediamines, xylylenediamines, aminocarboxylic acids, e.g. aminocaproic acid, and the corresponding lactams. Copolyamides composed of a plurality of the monomers mentioned are included.

Polyamides preferred according to the invention are prepared from caprolactams, very particularly preferably from ε-caprolactam, and also most of the compounding materials based on PA6, on PA66, and on other aliphatic and/or aromatic polyamides or copolyamides, where there are from 3 to 11 methylene groups for every polyamide group in the polymer chain.

Semicrystalline polyamides to be used according to the invention can also be used in a mixture with other polyamides and/or with further polymers.

Conventional additives, e.g. mould-release agents, stabilizers and/or flow aids, can be admixed in the melt with the polyamides or applied to the surface.

Polyesters are likewise preferred for use according to the invention, these being polyesters based on aromatic dicarboxylic acids and on an aliphatic or aromatic dihydroxy compound.

A first group of preferred polyesters is that of polyalkylene terephthalates, in particular those having from 2 to 10 carbon atoms in the alcohol moiety.

Polyalkylene terephthalates of this type are known and are described in the literature. Their main chain comprises an aromatic ring which derives from the aromatic dicarboxylic acid. There may also be substitution in the aromatic ring, e.g. by halogen, especially chlorine or bromine, or by $C_1$-$C_4$-alkyl groups, especially methyl, ethyl, iso- or n-propyl, or n-, iso- or tert-butyl groups.

These polyalkylene terephthalates may be prepared by reacting aromatic dicarboxylic acids, or their esters or other ester-forming derivatives, with aliphatic dihydroxy compounds in a known manner.

Preferred dicarboxylic acids that may be mentioned are 2,6-naphthalenedicarboxylic acid, terephthalic acid and isophthalic acid, and mixtures of these. Up to 30 mol %, preferably not more than 10 mol %, of the aromatic dicarboxylic acids may be replaced by aliphatic or cycloaliphatic dicarboxylic acids, such as adipic acid, azelaic acid, sebacic acid, dodecanedioic acids and cyclohexanedicarboxylic acids.

Among the aliphatic dihydroxy compounds, preference is given to diols having from 2 to 6 carbon atoms, in particular 1,2-ethanediol, 1,3-propanediol, 1,4-butanediol, 1,6-hexanediol, 1,4-hexane-diol, 1,4-cyclohexanediol, 1,4-cyclohexanedimethanol and neopentyl glycol, and mixtures of these.

Polyesters whose use is very particularly preferred are polyalkylene terephthalates derived from alkanediols having from 2 to 6 carbon atoms. Among these, particular preference is given to polyethylene terephthalate (PET), polypropylene terephthalate and polybutylene terephthalate (PBT), and mixtures of these. Preference is also given to PET and/or PBT which comprise, as other monomer units, up to 1% by weight, preferably up to 0.75% by weight, of 1,6-hexanediol and/or 2-methyl-1,5-pentanediol.

The viscosity number of polyesters whose use is preferred according to the invention is generally in the range from 50 to 220, preferably from 8 to 160 (measured in 0.5% strength by weight solution in a phenol/o-dichlorobenzene mixture in a ratio by weight of 1:1 at 25° C.) in accordance with ISO 1628.

Particular preference is given to polyesters whose carboxy end group content is up to 100 meq/kg of polyester, preferably up to 50 meq/kg of polyester and in particular up to 40 meq/kg of polyester. Polyesters of this type may be prepared, for example, by the process of DE-A 44 01 055. The carboxy end group content is usually determined by titration methods (e.g. potentiometry).

If polyester mixtures are used, the moulding compositions comprise a mixture composed of polyesters additionally including polyesters which differ from PBT, an example being polyethylene terephthalate (PET).

It is also advantageous to use recycled materials, such as PA recyclates or PET recyclates (also termed scrap PET), if appropriate mixed with polyalkylene terephthalates, such as PBT.

Recycled materials are generally:
1) those known as post-industrial recycled materials: these are production wastes during polycondensation or during processing, e.g. sprues from injection moulding, start-up material from injection moulding or extrusion, or edge trims from extruded sheets or foils.
2) post-consumer recycled materials: these are plastic items which are collected and treated after utilization by the end consumer. Blow-moulded PET bottles for mineral water, soft drinks and juices are easily the predominant items in terms of quantity.

Both types of recycled material may be used either as ground material or in the form of pellets. In the latter case, the crude recycled materials are separated and purified and then melted and pelletized using an extruder. This usually facilitates handling and free flow, and metering for further steps in processing.

The recycled materials used may be either pelletized or in the form of regrind. The edge length should not be more than 10 mm, preferably less than 8 mm.

Because polyesters undergo hydrolytic cleavage during processing (due to traces of moisture) it is advisable to predry the recycled material. The residual moisture content after drying is preferably <0.2%, in particular <0.05%.

Another group that may be mentioned of polyesters whose use is preferred is that of fully aromatic polyesters derived from aromatic dicarboxylic acids and aromatic dihydroxy compounds.

Suitable aromatic dicarboxylic acids are the compounds previously mentioned for the polyalkylene terephthalates. The mixtures preferably used are composed of from 5 to 100 mol % of isophthalic acid and from 0 to 95 mol % of terephthalic acid, in particular from about 50 to about 80% of terephthalic acid and from 20 to about 50% of isophthalic acid.

The aromatic dihydroxy compounds preferably have the general formula (I)

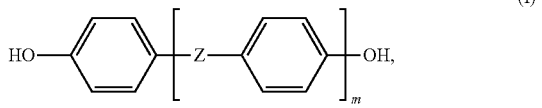

where
Z is an alkylene or cycloalkylene group having up to 8 carbon atoms, an arylene group having up to 12 carbon atoms, a carbonyl group, a sulphonyl group, an oxygen or sulphur atom, or a chemical bond, and where
m is from 0 to 2.

The phenylene groups of the compounds may also have substitution by $C_1$-$C_6$-alkyl or -alkoxy groups and fluorine, chlorine or bromine.

Examples of parent compounds for these compounds are dihydroxybiphenyl, di(hydroxyphenyl)alkane, di(hydroxyphenyl)cycloalkane, di(hydroxyphenyl) sulphide, di(hydroxyphenyl)ether, di(hydroxyphenyl) ketone, di(hydroxyphenyl) sulphoxide, α,α'-di(hydroxyphenyl) dialkylbenzene, di(hydroxyphenyl) sulphone, di(hydroxybenzoyl)benzene, resorcinol, and hydroquinone, and also the ring-alkylated and ring-halogenated derivatives of these.

Among these, preference is given to 4,4'-dihydroxybiphenyl, 2,4-di(4'-hydroxyphenyl)-2-methylbutane, α,α'-di(4-hydroxyphenyl)-p-diisopropylbenzene, 2,2-di(3'-methyl-4'-hydroxyphenyl)propane, and 2,2-di(3'-chloro-4'-hydroxyphenyl)propane, and in particular to 2,2-di(4'-hydroxyphenyl)propane, 2,2-di(3',5-dichlorodihydroxyphenyl)propane, 1,1-di(4'-hydroxyphenyl)cyclohexane, 3,4'-dihydroxybenzophenone, 4,4'-dihydroxydiphenyl sulphone and 2,2-di(3',5'-dimethyl-4'-hydroxyphenyl)propane and mixtures of these.

It is, of course, also possible to use mixtures of polyalkylene terephthalates and fully aromatic polyesters. These generally comprise from 20 to 98% by weight of the polyalkylene terephthalate and from 2 to 80% by weight of the fully aromatic polyester.

It is, of course, also possible to use polyester block copolymers, such as copolyetheresters. Products of this type are known and are described in the literature, e.g. in U.S. Pat. No. 3,651,014. Corresponding products are also available commercially, e.g. Hytrel® (DuPont).

According to the invention, materials whose use is preferred as polyesters also include halogen-free polycarbonates. Examples of suitable halogen-free polycarbonates are those based on diphenols of the general formula (II)

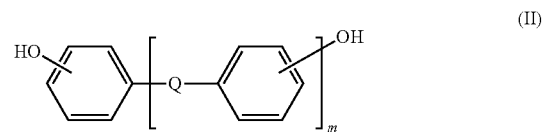

where
Q is a single bond, a $C_1$-$C_8$-alkylene, $C_2$-$C_3$-alkylidene, $C_3$-$C_6$-cycloalkylidene, $C_6$-$C_{12}$-arylene group, or —O—, —S— or —$SO_2$—, and m is a whole number from 0 to 2.

The phenylene radicals of the diphenols may also have substituents, such as $C_1$-$C_6$-alkyl or $C_1$-$C_6$-alkoxy.

Examples of preferred diphenols of the formula are hydroquinone, resorcinol, 4,4'-di-hydroxybiphenyl, 2,2-bis(4-hydroxyphenyl)propane, 2,4-bis(4-hydroxyphenyl)-2-methylbutane and 1,1-bis(4-hydroxyphenyl)cyclohexane. Particular preference is given to 2,2-bis(4-hydroxyphenyl)propane and 1,1-bis(4-hydroxyphenyl)cyclohexane, and also to 1,1-bis(4-hydroxyphenyl)-3,3,5-trimethylcyclohexane.

Either homopolycarbonates or copolycarbonates are suitable as component A, and preference is given to the copolycarbonates of bisphenol A, as well as to bisphenol A homopolymer.

Suitable polycarbonates may be branched in a known manner, specifically and preferably by incorporating from 0.05 to 2.0 mol %, based on the total of the diphenols used, of at least trifunctional compounds, especially those having three or more phenolic OH groups.

Polycarbonates which have proven particularly suitable have relative viscosities $\eta_{rel}$ of from 1.10 to 1.50, in particular from 1.25 to 1.40. This corresponds to an average molar mass $M_w$ (weight-average) of from 10 000 to 200 000 g/mol, preferably from 20 000 to 80 000 g/mol.

The diphenols of the general formula are known or can be prepared by known processes.

The polycarbonates may, for example, be prepared by reacting the diphenols with phosgene in the interfacial process, or with phosgene in the homogeneous-phase process (known as the pyridine process), and in each case the desired molecular weight may be achieved in a known manner by using an appropriate amount of known chain terminators. (In relation to polydiorganosiloxane-containing polycarbonates see, for example, DE-A 33 34 782.)

Examples of suitable chain terminators are phenol, p-tert-butylphenol, or else long-chain alkylphenols, such as 4-(1,3-tetramethylbutyl)phenol as in DE-A 28 42 005, or monoalkylphenols, or dialkylphenols with a total of from 8 to 20 carbon atoms in the alkyl substituents as in DE-A-35 06 472, such as p-nonylphenol, 3,5-di-tert-butylphenol, p-tert-octylphenol, p-dodecylphenol, 2-(3,5-dimethylheptyl)phenol and 4-(3,5-dimethylheptyl)phenol.

For the purposes of the present invention, halogen-free polycarbonates are polycarbonates composed of halogen-free diphenols, of halogen-free chain terminators and, if used, halogen-free branching agents, where the content of subordinate amounts at the ppm level of hydrolyzable chlorine, resulting, for example, from the preparation of the polycarbonates with phosgene in the interfacial process, is not regarded as meriting the term halogen-containing for the purposes of the invention. Polycarbonates of this type with contents of hydrolyzable chlorine at the ppm level are halogen-free polycarbonates for the purposes of the present invention.

Other suitable thermoplastic polymers that may be mentioned are amorphous polyester carbonates, where during the preparation process phosgene has been replaced by aromatic dicarboxylic acid units, such as isophthalic acid and/or terephthalic acid units. Reference may be made at this point to EP-A 0 711 810 for further details.

EP-A 0 365 916 describes other suitable copolycarbonates having cycloalkyl radicals as monomer units.

It is also possible for bisphenol A to be replaced by bisphenol TMC. Polycarbonates of this type are obtainable from Bayer AG with the trademark APEC HT®.

Finally, polypropylene may also be mentioned as polymer to be used with preference.

In another preferred embodiment of the present invention, at least one of the polymers or polymer moulding compositions to be used comprises from 0.001 to 75 parts by weight, preferably from 10 to 70 parts by weight, particularly preferably from 20 to 65 parts by weight, with particular preference from 30 to 65 parts by weight, of a filler or reinforcing material.

The filler or reinforcing material used can also comprise a mixture composed of two or more different fillers and/or reinforcing materials, for example based on talc, or mica, silicate, quartz, titanium dioxide, wollastonite, kaolin, amorphous silicas, magnesium carbonate, chalk, feldspar, barium sulphate, glass beads and/or fibrous fillers and/or reinforcing materials based on carbon fibres and/or glass fibres. It is preferable to use mineral particulate fillers based on talc, mica, silicate, quartz, titanium dioxide, wollastonite, kaolin, amorphous silicas, magnesium carbonate, chalk, feldspar, barium sulphate and/or glass fibres. It is particularly preferable to use mineral particulate fillers based on talc, wollastonite, kaolin and/or glass fibres, very particular preference being given to glass fibres.

Particular preference is moreover also given to the use of acicular mineral fillers. According to the invention, the term acicular mineral fillers means a mineral filler having pronounced acicular character. An example that may be mentioned is acicular wollastonites. The length:diameter ratio of the mineral is preferably from 2:1 to 35:1, particularly preferably from 3:1 to 19:1, with particular preference from 4:1 to 12:1. The average particle size, determined using a CILAS GRANULOMETER, of the inventive acicular minerals is preferably smaller than 20 µm, particularly preferably smaller than 15 µm, with particular preference smaller than 10 µm.

The filler and/or reinforcing material can, if appropriate, have been surface-modified, for example with a coupling agent or coupling-agent system, for example based silane. However, this pre-treatment is not essential. However, in particular when glass fibres are used it is also possible to use polymer dispersions, film-formers, branching agents and/or glass-fibre-processing aids, in addition to silanes.

The glass fibres whose use is particularly preferred according to the invention are added in the form of continuous-filament fibres or in the form of chopped or ground glass fibres, their fibre diameter generally being from 7 to 18 µm, preferably from 9 to 15 µm. The fibres can have been provided with a suitable size system and with a coupling agent or coupling-agent system, for example based on silane.

Coupling agents based on silane and commonly used for the pre-treatment are silane compounds, preferably silane compounds of the general formula (III)

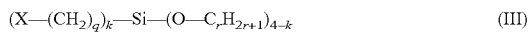  (III)

in which
X is $NH_2$—, HO— or

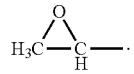

q is a whole number from 2 to 10, preferably from 3 to 4,
r is a whole number from 1 to 5, preferably from 1 to 2 and
k is a whole number from 1 to 3, preferably 1.

Coupling agents to which further preference is given are silane compounds from the group of aminopropyltrimethoxysilane, aminobutyltrimethoxysilane, aminopropyltriethoxysilane, aminobutyltriethoxysilane, and also the corresponding silanes which have a glycidyl group as substituent X.

The amounts generally used of the silane compounds for surface coating for modification of the fillers is from 0.05 to 2% by weight, preferably from 0.25 to 1.5% by weight and in particular from 0.5 to 1% by weight, based on the mineral filler.

The d97 or d50 value of the particulate fillers can, as a result of the processing to give the moulding composition or to give the moulding, be smaller in the moulding composition or in the moulding than in the fillers originally used. The length distributions of the glass fibres can, as a result of the processing to give the moulding composition or to give the moulding, be shorter in the moulding composition or in the moulding.

In the event that different plastics are used, these can comprise respectively from 0.001 to 70 parts by weight of the fillers individually or in a mixture with other fillers/reinforcing materials, preferably from 30 to 60 parts by weight, particularly preferably from 15 to 65 parts by weight, with particular preference from 15 to 60 parts by weight.

In every case, the amount of filler differs when the same polymer is used in the plastics to be used. However, when different polymers are used in the two plastics, the amount of filler present can certainly be identical.

If the same thermoplastic is used in the two plastics, the difference in filler content of the two thermoplastics is from 0:70 to 70:0 parts by weight, preferably from 30:65 to 65:30 parts by weight, particularly preferably from 15:60 to 60:15 parts by weight.

If the plastic used comprises different thermoplastics, it is preferable to use combinations of the PA-PBT or PA-PP group, where PA is polyamide, PBT is polybutylene terephthalate and PP is polypropylene.

In one preferred embodiment, the thermoplastic polymers to be used can comprise at least one compatibilizer, a component material which is capable, by way of a physical process, of bonding critical materials such as polypropylene to the polyamide or else vice versa. Compatibilizers to be used are described by way of example in DE 4 206 191A1 or U.S. Pat. No. 6,541,571B1.

A further aspect of the invention provides a process for producing a transverse-member motor-vehicle module for receiving the instrument panel of a motor vehicle using a plastics-metal-hybrid design comprising at least one partially plastics-surrounded main body composed of metal or of a high-strength plastics material, preferably in tubular form, and a simply moulded sheet-metal profile functioning as steering-column retainer and designed and placed in such a way that it, in the composite with at least one plastic to be moulded on, firstly gives a stiff connection between steering column and front wall and secondly has firm connection to the main body or, respectively, to the main body by way of a structure consisting entirely of plastic, characterized in that the transverse-member module is produced via an injection-moulding process, by the bi-injection moulding process, where, by way of the use of at least two different plastics moreover link elements for functional elements are moulded on, and the various plastics materials permit secure bonding of the various plastics parts to one another, in that the various plastics materials fuse with one another when they encounter one another in the bi-injection moulding process.

According to one embodiment of the invention, at least one of the plastics of the plastics parts forms an interlock bond with the main body.

According to one embodiment of the invention, at least one of the plastics of the plastics parts forms the interlock bond with an edge of the main body, and this edge permits displacement of the said plastics part on the main body in at least one direction, preferably in the longitudinal direction of the plastics part.

According to one embodiment of the invention, the fusion of the two different plastics takes place within the same cavity or cavities where they encounter one another.

According to one embodiment of the invention, the main body is composed of metal or of a high-strength plastics material.

According to one embodiment of the invention, steel, aluminium or magnesium or alloys of the said metals with other metals is/are used as metal for the main body.

According to one embodiment of the invention, the plastic selected comprises at least one plastic from the group of polyamide, polyester, polypropylene or any possible mixture of the polymers mentioned.

According to one embodiment of the invention, the plastics materials to be processed differ via the content of fillers and/or of reinforcing materials.

According to one embodiment of the invention, a multipart main body is used, where the individual parts of the main body are bonded to one another via the injection-moulding process by way of one of the thermoplastic parts.

Another aspect of the invention provides a transverse-member motor-vehicle module produced by a process as described above.

For clarification, it should be noted that the scope of the invention comprises all of the definitions and parameters listed above in general terms or in preferred ranges, in any desired combination.

The examples below provide further explanation of the invention by using the figures, but do not restrict the invention.

BRIEF DESCRIPTION OF THE SEVERAL VIEWS OF THE DRAWING(S)

The invention is described purely by way of example below, using the attached figures:

FIG. 1A shows a depiction of two plastic components and sheet-metal profiles.

FIG. 2A shows a depiction of two plastic components and sheet-metal profiles.

DETAILED DESCRIPTION OF THE INVENTION

Figure 1:
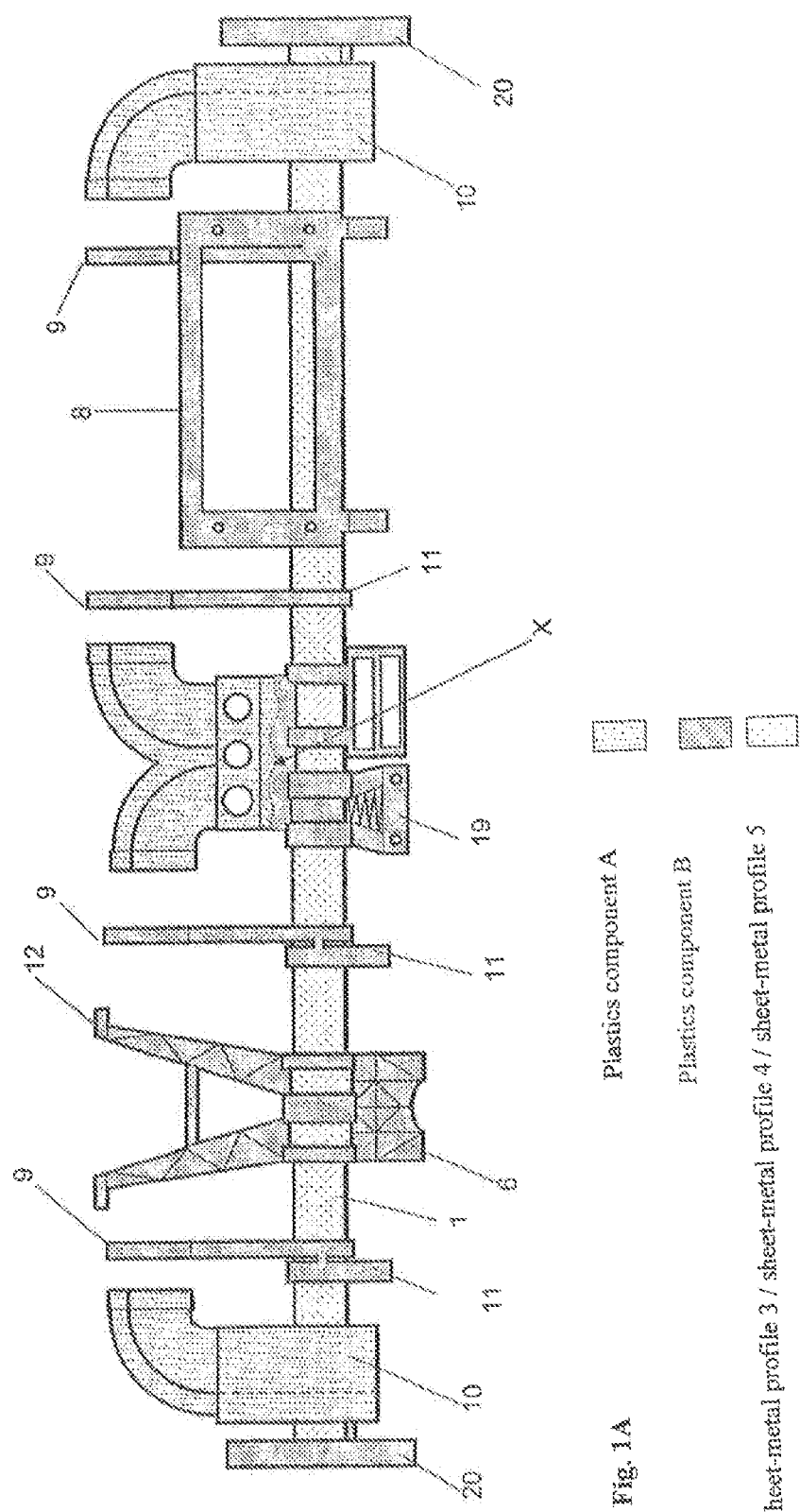
FIG. 1 shows a rear view of a transverse-member module in the position required for installation in a vehicle.

FIG. 1 shows a rear view of a transverse-member module in the position required for installation in a vehicle. The plastics components A and B moulded on in the bi-injection moulding process, and the 3 sheet-metal profiles 3, 4, 5 are shown with different shading. The melt fronts encounter one another in the region indicated (dotted line). X indicates the locations where plastics component A and plastics component B encounter one another.

Numeral 1 represents the main body, numeral 4,5 represent the link elements.

Figure 2:
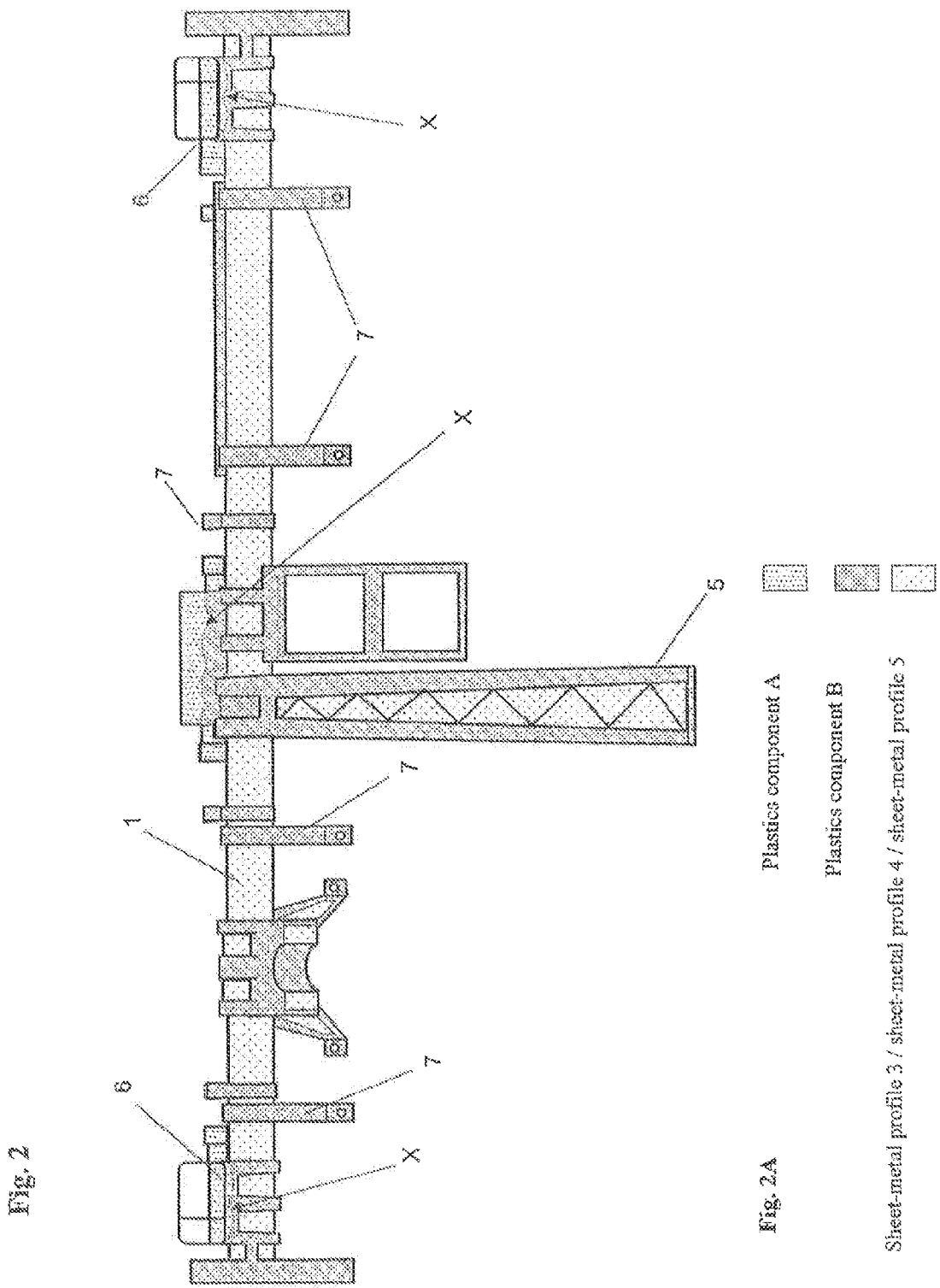
FIG. 2 shows a plan view of a transverse-member module in the position required for installation in a vehicle.

FIG. 2 shows a plan view of a transverse-member module in the position required for installation in a vehicle. The plastics components A and B moulded on in the bi-injection moulding process, and the 3 sheet-metal profiles 3, 4, 5 are shown with different shading. The melt fronts encounter one another in the region indicated (dotted line). X indicates the location where plastics component A and plastics component B encounter one another.

Figure 3:
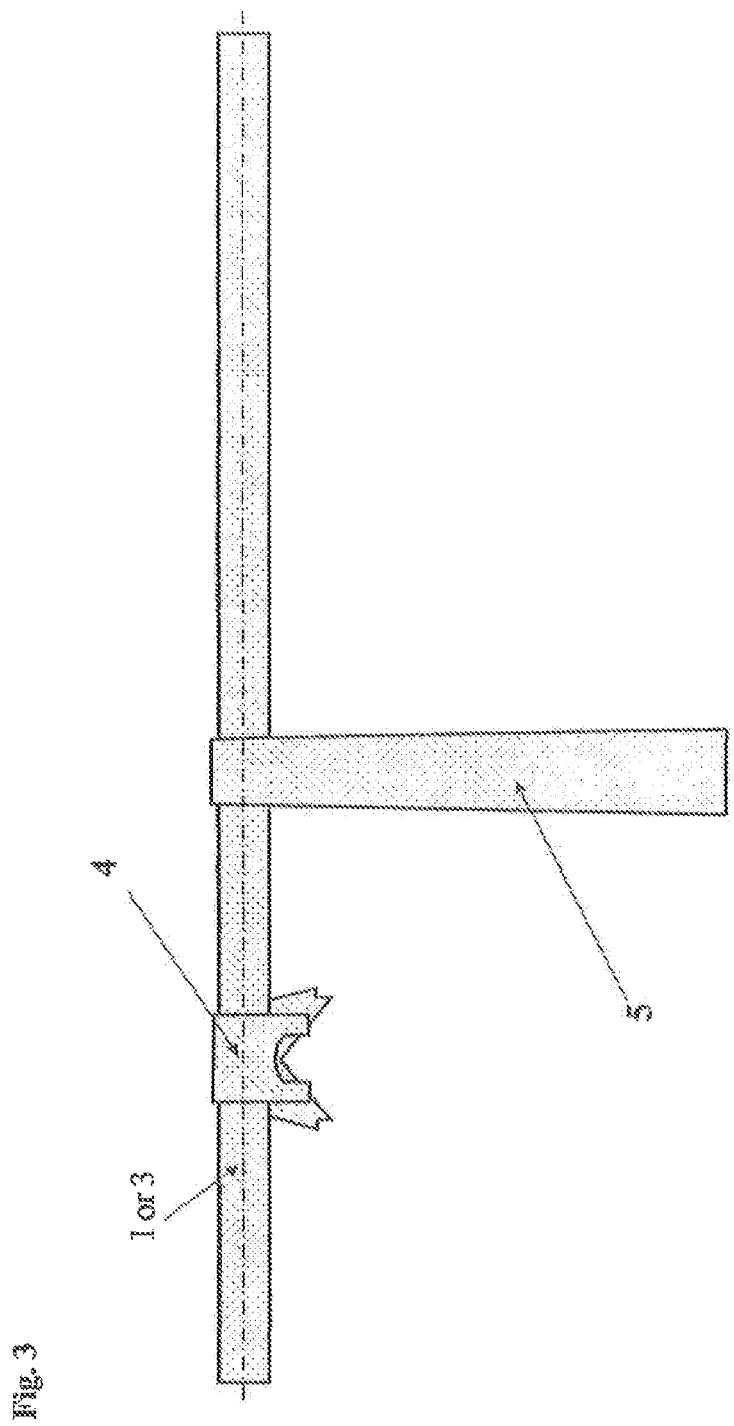
FIG. 3 shows a rear view of the 3 sheet-metal inserts of the transverse-member module according to FIG. 1 and FIG. 2 prior to the overmoulding process using plastic.

FIG. 3 shows a rear view of the 3 sheet-metal inserts of the transverse-member module according to FIG. 1 and FIG. 2 prior to the overmoulding process using plastic. The following are not shown: the perforations in the sheet-metal profiles (FIG. 3) and the plastic injection-moulded around and through these, and the plastic moulded around the edges (FIG. 1 and FIG. 2). The numerals 3, 4 and indicate the individual sheet-metal inserts.

Figure 4:
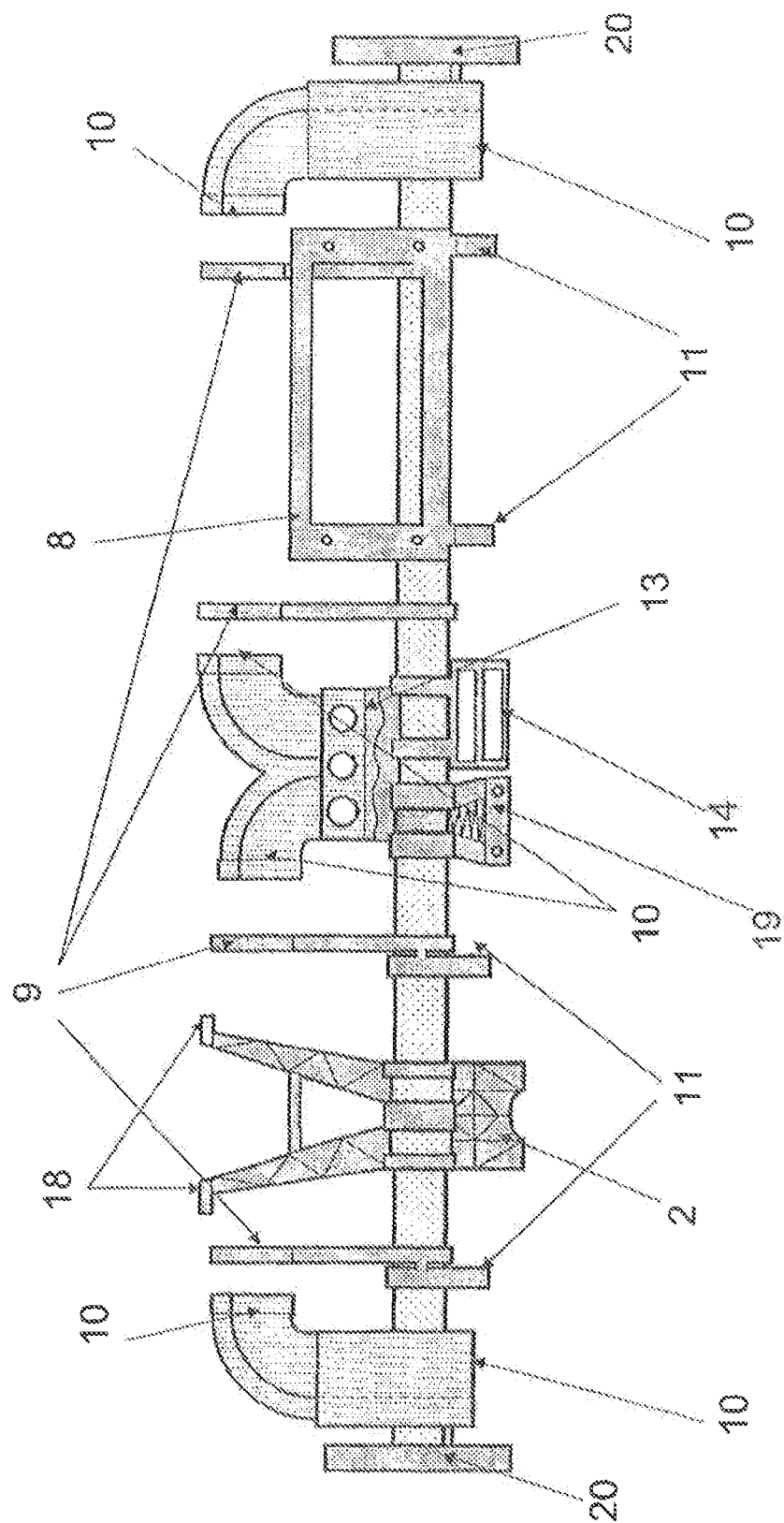
FIG. 4 shows a plan view of a transverse-member module in the position required for installation in a vehicle.

FIG. 4 shows a plan view of a transverse-member module in the position required for installation in a vehicle.

The following functions or link elements for functional elements have been shown and indicated 2 Steering-column retainer
6,7 Link elements (generally)
8 Airbag housing retainer
9 Air duct retainer
10 Ventilation nozzles/air outlet/air ducts connection
11 Knee absorber retainer
12 (Glovebox retainer=not shown)
13 Air-conditioning equipment retainer
14 Multimedia equipment retainer (navigation equipment, radio, telephone . . . )
15 (Security box retainer=not shown)
16 (Cockpit instruments retainer=not shown)
17 (Fastening/connection to instrument panel=not shown)
18 Fastening/connection to bulkhead 19 Fastening/connection to centre console/tunnel strut
20 Fastening/link to A-columns
21 (Cable harness fastening=not shown)

Figure 5:
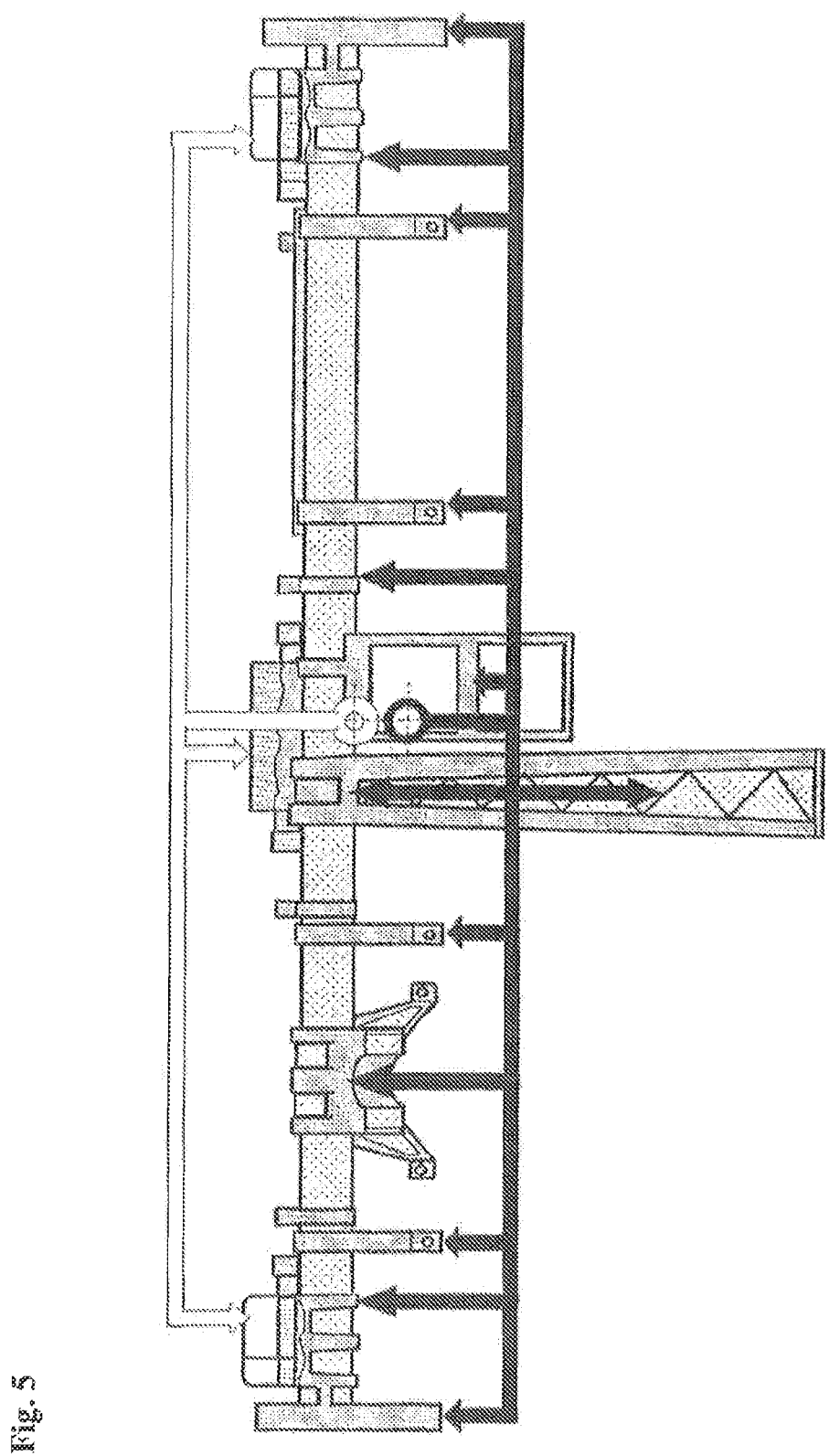
FIG. 5 shows a transverse-member module with a diagram of the feed system for the injection mould.

FIG. 5 shows a transverse-member module with a diagram of the feed system for the injection mould. Plastics components A and B pass through separate runners from the plastifying units (for component A and component B) to reach the cavity of the injection mould. The sheet-metal profiles 3, 4 and 5 (FIG. 3) inserted into the injection mould are overmoulded by plastics components A and B to give the predetermined geometry.

The metal tube 1 generally indicated as main body in the transverse-member module is shown in FIG. 3 without any specific shaping of the metal tube or of any individual link elements. However, it should be clear that the specific geometry is intended only as an example, to the extent that this is not apparent from the explanation below.

The transverse-member module of the invention as shown in (FIG. 1), composed of steering-column retainer 12, main body/metal tube 1 and tunnel strut, serves to receive the instrument panel of a vehicle, and, during assembly, is linked to the A columns, the bulkhead and the Kardan tunnel of a motor vehicle. The transverse-member module comprises a metal tube 1 which is seamless or which has a longitudinal weld seam, preferably a steel tube, the external dimensions of which have narrow tolerances. The metal tube has preferably been pinched at both of its ends. There are holes located at these pinched ends and serving as screw-on lugs for the A-pillars. The location of the holes is therefore in that region of the metal tube which is used by the transverse member to produce a rigid connection between the A-pillars. In order in particular also to permit absorption of large forces arising in the event of a side impact, the design of the metal tube 1 is moreover preferably straight, i.e. the metal tube 1 has no curved sections where bending deformation can occur when pressure forces are introduced into the metal tube 1 by way of the pinched ends.

During the production of the transverse member, the metal tube 1 is overmoulded with plastic A and/or B in an injection-moulding plant. It is preferable here to use fibre-reinforced plastic, preferably glass-fibre-filled plastic. The material Durethan® PA GF60 (polyamide with 60% by weight glass fibre content from Lanxess Deutschland GmbH) has proven particularly suitable here. The overmoulded plastic can cover the entire metal tube 1, or else there can be regions where it has no overmoulded plastic. If the metal tube 1 is not to be completely overmoulded, there are particular requirements placed upon the dimensional accuracy of the moulds, and also of the metal tube 1, in the injection-moulding plant, and the metal tube 1 should therefore have narrow tolerances with respect to the external dimensions.

The advantage of using plastic A and/or B to overmould the metal tube 1 is that sites where high strength and stiffness is demanded can be realized via the metal tube whereas sites serving merely for linking of components to be incorporated later can be moulded on, from plastic. In the same way it is also possible to achieve further differentiation within the plastic used. By way of example, it would be possible to use a fibre-reinforced and in particular glass-fibre-filled plastic only at those sites where in turn increased mechanical requirements are placed upon the plastic, whereas plastic with a low level of fibre reinforcement plastic without fibre reinforcement can be used elsewhere. In the case of the transverse-member module shown in FIG. 1, it is possible that all of the plastics parts are moulded on in a single manufacturing step.

DE 10 2005 004 605 A1 discloses alternative embodiments, and also further elements, and also production methods for the metal tube of the transverse member.

In contrast to solutions consisting entirely of plastic, the plastics-metal-composite solution described in the present invention for the transverse-member module in the form of metal tube and steering-column retainer permits achievement of first-mode natural frequencies >36 Hz in the installed condition, these otherwise being achievable only by using designs which are composed of metal and are therefore markedly heavier.

The structure of the transverse-member module composed of metal tube 1 and steering-column retainer 2, both using hybrid technology, preferably with plastics ribbing, is designed so as also to guarantee a simple, robust production process.

In in-house trials on components, it was found that with polyamide in the bi-injection moulding process (=simultaneous injection without solidification of a melt front before it encounters the second melt front) the strength of the confluence zone is the same as the weld line strength of a conventional single-plastic component or indeed higher if process parameters are optimized.

Within the prior art cited above, citations are mentioned which describe a multicomponent process in which the plastics components are injected in succession.

A consequence of that, at least in the case of PA (polyamide) and in the case of PBT (polybutylene terephthalate) is a marked decrease in strength in the confluence zone, to 60% of the nominal weld line strength in the case of Durethan® BKV30 from Lanxess Deutschland GmbH. The levels achieved when injection is simultaneous and two melt fronts encounter one another were 100% (and higher if process parameters were optimized), and this is after all the decisive criterion for the performance of the component.

It is possible to achieve levels above 100%. When the melts encounter one another, whichever melt front has higher viscosity at this juncture penetrates into the other melt front. Although the melt fronts did not mix, the contact area was greatly increased, and the tongue of melt that has penetrated into the other material is gripped by the other, outer plastics component. This effect could also be amplified by delayed switchover to hold pressure in the plastics component that penetrates into the other material.

At the same time, the structure of the mould became simpler because there was no need to provide slides or bars in order to make the cavity available for the second plastics component. Cycle times were shortened because there was no need to wait until the first melt front had solidified sufficiently to permit withdrawal of the slide in order to allow bonding to the second plastics component.

The invention claimed is:

1. A transverse-member motor-vehicle module for receiving an instrument panel of a motor vehicle comprising
a partially plastics component A and plastic component B-surrounded main body (1) composed of metal or of a high-strength plastics material,
a moulded sheet-metal profile (3) functioning as a steering-column retainer (2), and being mouldable to the at least one partially plastics component A and plastic component B-surrounded main body,
at least two first link elements (6,7) surrounded by plastics components A and plastic components B,
at least two second link elements (4,5) surrounded by plastics components A and plastic components B, wherein the at least two first link elements (6, 7) are simultaneously moulded onto the main body (1), and wherein the plastics component A and plastic component B permit secure bonding of the at least two second link elements (4,5) surrounded by plastics components A and plastic components B, to one another, wherein the melt fronts of the plastics component A and plastic component B fuse with one another when they encounter one another in a bi-injection moulding process.

2. The transverse-member motor-vehicle module according to claim 1, wherein the at least first and the at least second link elements have reinforcing ribs.

3. The transverse-member motor-vehicle module according to claim 2, wherein the reinforcing ribs have been securely connected to the sheet-metal profile (3, 4, 5) at discrete connection sites by way of perforations in the sheet-metal profile (3, 4, 5), wherein the plastic extends through the perforations and extends over the surfaces of the perforations.

4. The transverse-member motor-vehicle module according to claim 3, wherein the plastic is a thermoplastic polymer.

5. The transverse-member motor-vehicle module according to claim 4, wherein at least one of the thermoplastic polymers is from the group of the polyamides, polyesters or polypropylene or a mixture of thereof.

6. The transverse-member motor-vehicle module according to claim 4, wherein the thermoplastic polymers comprises from 0.001 to 75 parts by weight of a filler or reinforcing material.

7. The transverse-member motor-vehicle module according to claim 6, wherein the sheet-metal profile (4, 5) and/or the main body (1) is coated with adhesion promoter or adhesive.

8. The transverse-member motor-vehicle module according to claim 1, wherein the metal or high-strength plastics material of the at least one partially plastics components A and plastic components B-surrounded main body (1) is tubular.

9. A process for influencing the intrinsic vibration behavior of an instrument-panel support of a motor vehicle in installed condition to give a first-mode natural frequency >36 Hz, comprising the steps of attaching a transverse-member module under the instrument panel of a motor vehicle, comprising at least one partially plastics component A and plastic component B-surrounded main body (1) composed of metal or of a high-strength plastics material, providing a moulded sheet-metal profile functioning as steering-column retainer (2) and designed and placed such that, in the composite with at least one plastic component A or plastic component B to be moulded on, a stiff connection results between steering column and front wall and a firm connection to the main body (1) is achieved by way of a structure consisting entirely of plastic, moulding on simultaneously , by using at least two different plastics component A and plastic component B, link elements (6, 7) and providing secure bonding of the plastics component A and plastic component B to one another, in that the plastics component A and plastic component B fuse with one another when they encounter one another in the bi-injection moulding process.

10. The transverse-member motor-vehicle module according to claim 9, providing a further step of wherein, after the overmoulding process, the sheet-metal profile (4, 5) is connected to the plastics structure via riveting.

11. The process of claim 9, wherein the riveting process is one of hot-riveting, clinching, adhesive bonding, or screw-thread methods and the riveting is an additional bond to the bond provided by the injection-moulding procedure.

12. A method of using a transverse-member module for attachment under an instrument panel of a motor vehicle, comprising an at least partially plastic component A and plastic component B-surrounded tubular main body (1), composed of metal or high-strength plastics material, and a moulded sheet-metal profile functioning as steering-column retainer (2) and designed and placed in such a way that it, in the composite with moulded-on plastic, firstly gives a stiff connection between steering column and front wall and secondly has firm connection to the main body (1) by way of a structure consisting entirely of plastic, where, by way of the use of at least two different plastic component A and plastic component B moreover link elements (6, 7) for functional elements are moulded on, and the various plastics materials (A or B) permit secure bonding of the various plastics parts to one another, in that the at least partially plastic component A and plastic component B fuse with one another when they encounter one another in the bi-injection moulding process, for influencing the intrinsic vibration behavior of the instrument-panel support in the installed condition to give a first-mode natural frequency >36 Hz.

\* \* \* \* \*